(12) United States Patent  
Brenninger et al.

(10) Patent No.: US 7,641,008 B2  
(45) Date of Patent: Jan. 5, 2010

(54) UTILITY VEHICLE DRIVE TRAIN

(75) Inventors: Martin Brenninger, Marktoberdorf (DE); Richard Heindl, Marktoberdorf (DE); Johann Wittman, Marktoberdorf (DE)

(73) Assignee: AGCO GmbH, Marktoberdorf (DE)

( * ) Notice: Subject to any disclaimer, the term of this patent is extended or adjusted under 35 U.S.C. 154(b) by 398 days.

(21) Appl. No.: 11/639,407

(22) Filed: Dec. 14, 2006

(65) Prior Publication Data

US 2007/0144855 A1 Jun. 28, 2007

(30) Foreign Application Priority Data

Dec. 17, 2005 (GB) .................................. 0525731.6

(51) Int. Cl.  
*B60K 25/08* (2006.01)

(52) U.S. Cl. .................................................... 180/53.6
(58) Field of Classification Search ................ 180/53.6, 180/53.61, 53.7; 192/48.5, 48.7, 48.8, 87.1; 74/15.6, 15.63, 15.8  
See application file for complete search history.

(56) References Cited

U.S. PATENT DOCUMENTS

| 3,161,270 | A | * | 12/1964 | Aschauer ................... 192/53.1 |
| 4,807,732 | A | * | 2/1989 | Lehle ......................... 192/48.5 |
| 5,937,697 | A | * | 8/1999 | Matsufuji ....................... 74/11 |
| 6,003,391 | A | * | 12/1999 | Kojima et al. .............. 74/15.66 |
| 2005/0120818 | A1 | * | 6/2005 | Matsufuji et al. ............. 74/339 |
| 2005/0194229 | A1 | * | 9/2005 | Grethel et al. ............. 192/48.8 |

FOREIGN PATENT DOCUMENTS

| DE | 3901229 | 8/1990 |
| DE | 19804353 | 8/1998 |
| GB | 1167870 | 10/1969 |
| JP | 6191298 | 7/1994 |

* cited by examiner

*Primary Examiner*—Paul N Dickson  
*Assistant Examiner*—Robert A Coker

(57) ABSTRACT

Described is a utility vehicle, in particular an agricultural tractor, with a front axle (3), which can be driven by a drive element of a first multi-disc clutch (11), connected in a driven manner to the drive train (2) and a power take-off shaft (4) which can be driven by the drive train (2) at speed proportionately to the speed of the vehicle over the ground (ground speed power take-off).

Figure 1:
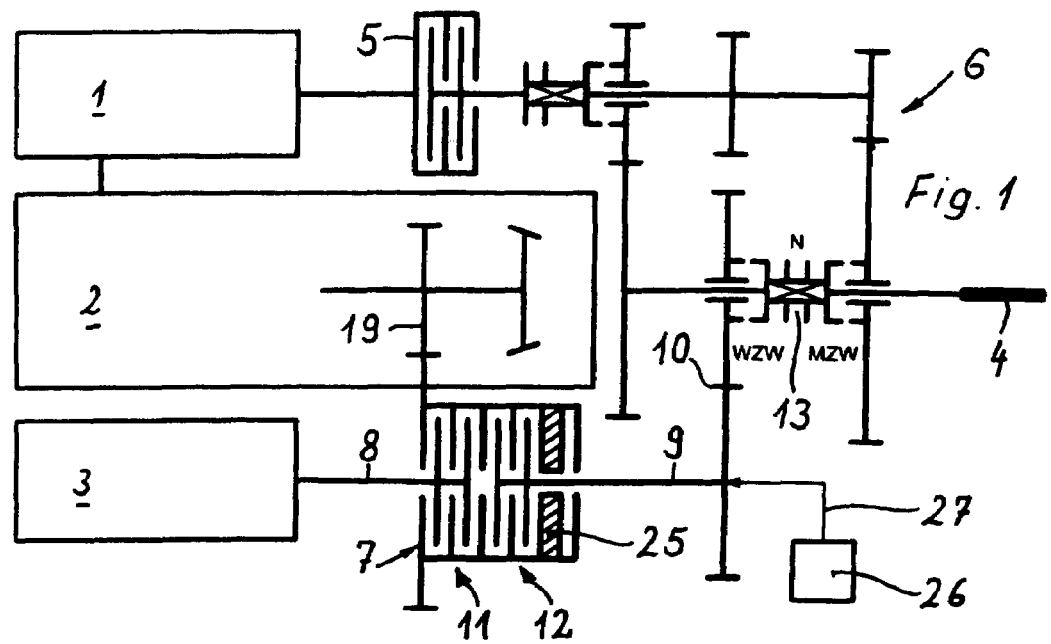

In order to keep expenditure low on the control of the disc clutch (11) and the power take-off shaft (4), it is proposed that the power take-off shaft can be driven at a speed proportional to the speed of the vehicle over the ground by a second multi-disc clutch (12) which has a drive element connected in a driven manner to the drive train (2), and that both multi-disc clutches (11, 12) are actuated in common.

9 Claims, 1 Drawing Sheet

UTILITY VEHICLE DRIVE TRAIN

This Application is based on, and claims priority to, UK Application No. GB0525731.6, filed Dec. 17, 2005.

The invention relates to a utility vehicle, in particular an agricultural tractor, with an axle which is capable of being driven by a drive element of a multi-disc clutch connected in a driven manner to the vehicle drive train, and a power take-off shaft capable of being driven by means of a coupling sleeve optionally by the vehicle drive train and a drive element proportionally to the speed of the vehicle (ground speed power take-off) or proportionally to the revolution speed of the drive engine (engine speed power take-off).

A vehicle of this kind with a driven front axle is described in DE 39 01 229 A1. For a better understanding of the following, it is pointed out that the expression "power take-off shaft" is used when the shaft component as such is being referred to. The expression "ground speed power take-off shaft" indicates that such a power take-off shaft is driven proportionally to the speed of the vehicle, while the expression "engine speed power take-off shaft" indicates that the shaft is powered at revolution speeds which are proportional to the revolution speed of the engine of the vehicle. With the vehicle referred to, a positive drive connection is established by means of a coupling sleeve between the drive shaft of the drive engine or the drive train on the one hand, and the power take-off shaft on the other. Because of the positive drive connection in the drive train between the drive wheels of the vehicle and the wheels of the driven-axle trailer, and the roll diameters of the drive wheels not exactly concurring with the specified values, it is possible, during transport journeys with trailers of which the driven axle is driven by a power take-off shaft, that stresses will occur in the drive train. Apart from increased tyre wear, this also inhibits or prevents the engagement of the drive shaft. Moreover, because the coupling sleeve forms a positive drive connection, the power take-off shaft can in principle only be engaged when the vehicle is stationary, which is associated with undesirable interruptions to the work sequence. To engage an engine power take-off shaft during travel, it is known from DE 198 04 353 C2 to provide a multi-disc clutch in the drive path from the drive engine to the power take-off shaft which takes effect in a non-positive (slipping) manner, but no power take-off shaft driven at ground speed is provided for in that case.

The object of the invention is to provide a utility vehicle of the type described in the preamble, in which the power take-off shaft can be connected for driving at ground speed during travel under load, wherein in particular a low expenditure of effort is required to engage ground speed.

To achieve this object, it is proposed that, in order to drive the power take-off shaft at ground speed, a second multi-disc clutch is arranged in the drive path from the drive train to the power take-off shaft, which clutch has a drive element connected in a driven manner to the drive train, and that both disc clutches are actuated in common. Further advantageous embodiments of the invention are derived from the sub-claims.

The invention makes use of the knowledge that there are no situations of application in which the all-wheel drive must be disconnected when the ground speed power take-off is engaged. As a result of the fact that, by engaging the ground speed power take-off, the drive of the axle of the vehicle is also engaged, it is possible for both disc clutches to be actuated by a common control device. An actuating device suitable for this, with hydraulically-actuated disc clutches with an actuating piston compressing the individual disc package, consists simply of an electrically actuated valve, by means of which the actuating pistons of both disc clutches can be subjected to pressure. By doing without a valve and its control device, expenditure on the actuating device can be kept low.

In order for the vehicle with the axle engaged to be operated without the power take-off shaft being driven at ground speed a coupling sleeve element is provided in the drive path from the second clutch to the power take-off shaft, the coupling sleeve having a neutral position (N) and an engaged position (WZW) for connecting the power take-off shaft with the drive train to provide a power take-off speed which is proportional to the ground speed of the vehicle.

According to a further feature of the invention, the multi disc clutches are engaged by means of a sequence control unit after the displacement of the coupling sleeve into the engaged position. This represents a considerable easing of the operational burden for the driver of the vehicle, since he needs only to carry out one switching procedure. Thanks to the sequence control unit, it can be ensured that the multi-disc clutches are disengaged while the disc sleeve is pushed into the engaged position (WZW).

The coupling sleeve may have a further position (NZW) for connecting to power take-off shaft with the engine to provide a power take-off shaft speed which is proportional to the speed of rotation of the engine.

One possibility of reducing the construction expenditure and spatial requirement for the vehicle components involved is that the disc clutches are housed within a common clutch bell which acts as a clutch input and which is driven from the drive train, the first clutch comprising a first pack of clutch discs which are alternately non-rotatably connected with the clutch bell and a first output shaft which drives the axle and the second clutch comprising a second pack of clutch discs which are alternately non-rotatably connected with the clutch bell and a second output shaft which drives the power take-off shaft, the clutches being engaged by compressing the packs of discs.

In this connection, a further possibility arises of reducing the expenditure for the actuating device by arranging a single actuating piston housed in the clutch bell to actuate both disc clutches. This leads to substantial savings, since by doing away with one of the actuating pistons a number of components interacting with it can also be dispensed with. In comparison with the known vehicle, this solution variant is extremely economical, since in addition to the space made available, only the additional discs for the travel power take-off need be provided.

The output shafts may extend into the clutch bell sufficiently to engage their respective associated pack of clutch discs, the ends of the output shafts supporting each other via bearing means and being spaced from each other by a clearance.

In order to achieve a reliable disconnection of the disc packs in the clutch bell, the disc packs may be separated from one another by means of a spacer disc which is driven from the clutch bell housing and which extends across the clearance between the ends of the shafts.

For vehicle variants without a ground speed power take-off capability, the appropriate clutch discs can be dispensed with and replaced by a spacer piece of the same width. The same applies to vehicle variants without any front axle drive.

With the ground speed power take-off which can be engaged while under load, it is possible for the user to drive with a driven-axle trailer to the edge of the field and then, without losing momentum, to travel into the field and there make use of the additional traction force of front axle and driven-axle trailer by engaging the disc clutches.

Figure 2:
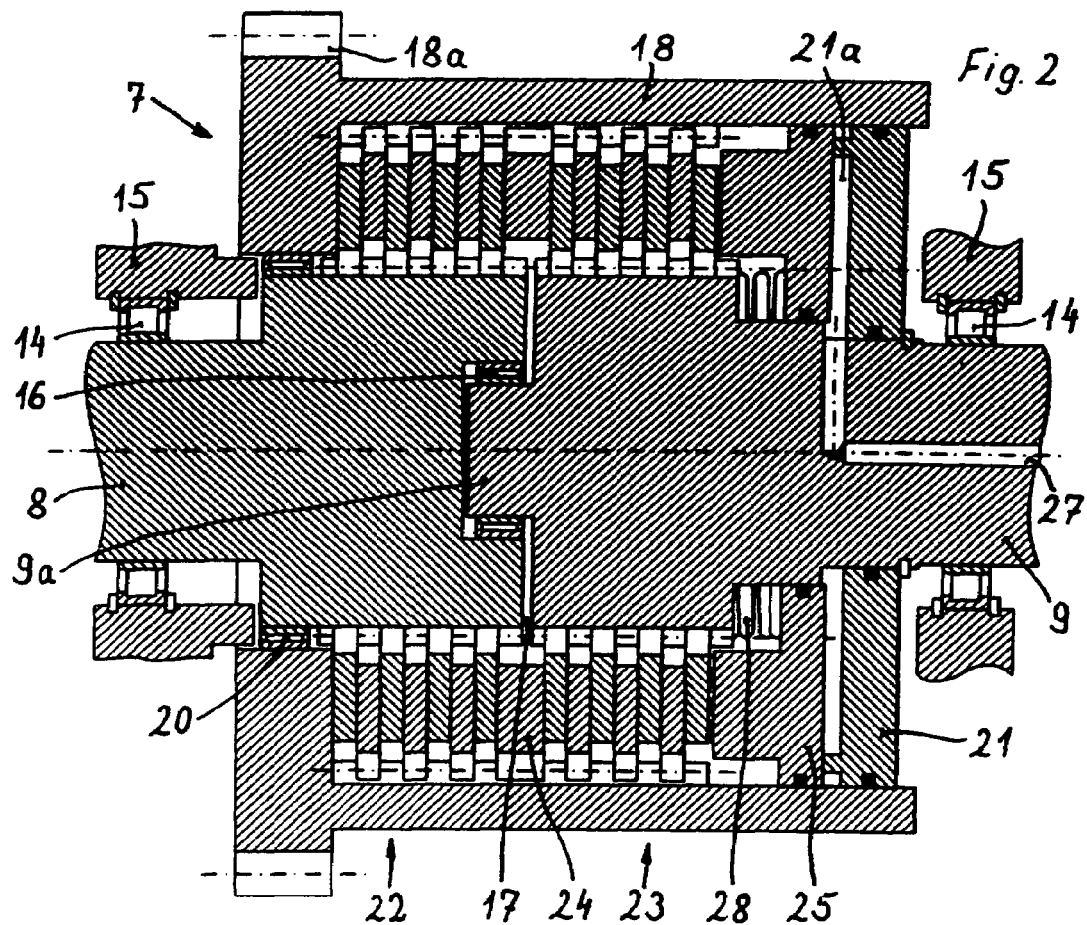

The invention is, by way of example only, described in greater detail hereinafter with reference to the accompanying drawings which show:

FIG. 1 A diagrammatic representation of a drive unit for the front axle and power take-off shaft of an agricultural tractor, and FIG. 2 A sectional view of the disc clutches for the drive of the front axle and power take-off shaft.

According to FIG. 1, an agricultural tractor has a drive engine 1, a multi speed drive train 2 driven by the engine, a front axle 3, and a power take-off shaft 4. A power train extending from the drive engine 1 to the power take-off shaft 4 contains a disc clutch 5 and a two-stage gear unit 6 to create different revolution speed levels at the engine power take-off shaft 4 which are dependent on the speed of revolution of the engine.

A second power train extending from the drive train 2 to the power take-off shaft 4 contains a disc clutch arrangement 7, drive shafts 8, 9 extending from this clutch, and a gear drive 10. The disc clutch arrangement 7 is driven from a gearwheel 19 of drive train 2 and comprises a first disc clutch 11 and a second disc clutch 12. Clutch 11 when engaged drives shaft 8 which is in driving connection with the front axle 3, and drives shaft 9 which is connected with the power take-off shaft 4 via the geardrive stage 10. By means of a coupling sleeve 13, which can be displaced out of a neutral middle position N, in which any power flow is interrupted, a power flow can be established when said sleeve is in its right-hand position MZW, from the drive engine 1 to the power take-off shaft 4, in order to form an engine speed power take-off facility when the speed of rotation of the power take-off shaft 4 is proportional to the speed of rotation of the engine 1. In a left-hand setting WZW of the coupling sleeve 13, a power flow is produced from the drive train 2 to the power take-off shaft 4, in order to establish a ground speed power take-off facility when the speed of rotation of the power take-off shaft 4 is proportional to the speed of the tractor over the ground.

As can be seen from FIG. 2, the drive shafts 8, 9 are mounted close to the disc clutch arrangement 7 by means of roller bearings 14, in a clutch housing indicated at 15. The drive shaft 9 for the ground speed power take-off has on its end a journal 9a, on which the drive shaft 8 for the front axle is supported by means of a roller bearing 16. In this situation, there is only a narrow separation gap 17 located between the ends of the two drive shafts 8, 9. Rotatably mounted on the drive shafts 8, 9 is a clutch bell 18, which is driven by a toothed rim 18a from the gearwheel 19 in the drive train 2. The clutch bell 18 is supported on the drive shaft 8 for the front axle by means of a roller bearing 20. On the drive shaft 9 for the ground speed power take-off, the clutch bell 18 is supported by means of an end plate 21, which closes the end of the clutch bell.

No substantial relative revolution speeds occur in operation between the drive shafts and the clutch bell which could impose a load on the bearing, because, when the front axle 3 is not being powered, the drive shaft 8 is driven by the axle at a revolution speed which corresponds closely to the revolution speed of the clutch bell 18. The same applies to the drive shaft 9 for the ground speed power take-off shaft, which, as long as it is not in non-positive connection with the drive train 2, is driven in the WZW position of the coupling sleeve 13 by the driven axle of the trailer at approximately the revolution speed of the clutch bell 18. Practically no relative revolution speed occurs between the drive shafts 8, 9 and the clutch bell 18 when the coupling sleeve 13 is in the neutral position N or in the MZW position (engine power take-off), since in this case the entire drive chain as far as the gearwheel stage 10 is being carried in sympathy with the clutch bell 18.

Located in the interior of the clutch bell 18 are two clutch disc packs 22, 23, which consist of discs connected alternately in a torsionally-resistant manner to the drive shaft 8 or 9 respectively and the clutch bell 18. The disc pack 22 forms clutch 11, and the disc pack 23 forms clutch 12. Both clutch disc packs 22, 23 are separated from one another by means of a spacer disc 24, connected in a torsionally-resistant manner to the clutch bell 18, which is thicker in comparison with the discs of packs 22 and 23 an which covers the separation gap 17. In order to establish a non-positive drive connection from the clutch bell 18 to the drive shafts 8, 9, an actuating piston 25 is arranged between the end plate 21 and the disc pack 23. This can be subjected to pressure by means of a line 27 coming from an actuating device 26, which opens into a chamber 21a between piston 25 and the end plate 21. When chamber 21a is pressurised, the actuating piston 25 presses the disc packs 22, 23 together against the force of a pre-tensioned pressure spring 28. Both disc clutches 11, 12 are therefore closed simultaneously, and the desired power flow is produced to the drive shafts 8, 9 for the drive of the front axle 3 and the ground speed power take-off. If the coupling sleeve 13 is pushed into the switching position WZW before the actuation of the disc clutch arrangement 7, the power take-off shaft 4 is driven in a ground speed dependent manner, for example for the drive of a driven-axle trailer.

For the sake of completeness, it should be pointed out that a disc clutch arrangement 7 of this kind can also be used in vehicles in which the front axle is not driven, or do not have any ground speed power take-off shaft. In these cases, the appropriate disc pack 22 or 23 may be removed from the clutch bell and replaced by an intermediate spacer piece of the same width, which can be inserted in a torsionally-resistant manner into the clutch bell.

The invention claimed is:

1. A utility vehicle, in particular an agricultural tractor, having an engine which drives a drive train in a drive path, which drive train is capable of driving an axle via a first multi-disc clutch, a power take-off shaft is also provided which is capable of being driven by the vehicle drive train at a speed proportional to the ground speed of the vehicle, wherein in order to engage drive to the power take-off shaft at a speed which is proportional to the ground speed of the vehicle, a second multi-disc clutch is arranged in the drive path from the drive train (2) to the power take-off shaft, said second clutch having a gear drive operatively connected to the drive train and both multi-disc clutches are actuated in common.

2. A utility vehicle according to claim 1, wherein both multi-disc clutches have a joint actuating device.

3. A utility vehicle according to claim 1, wherein a slideable coupling sleeve element is provided in the drive path from the second clutch to the power take-off shaft, the coupling sleeve having a neutral position and an engaged position for connecting the power take-off shaft with the drive train to provide a power take-off speed which is proportional to the ground speed of the vehicle.

4. A utility vehicle according to claim 3 wherein the multi-disc clutches are engaged by the compression of associated disc packs after the displacement of the coupling sleeve into the engaged position.

5. A vehicle according to claim 3 wherein the coupling sleeve has a further position for connecting the power take-off shaft with the engine to provide a power take-off shaft speed which is proportional to the speed of rotation of the engine.

6. A vehicle according to claim 1 wherein the disc clutches are housed within a common clutch bell which acts as a clutch input and which is driven from the drive train, the first clutch comprising a first pack of clutch discs which are alternately non-rotatably connected with the clutch bell and a first output shaft which drives the axle and the second clutch comprising a second pack of clutch discs which are alternately non-rotatably connected with the clutch bell and a second output shaft which drives the power take-off shaft, the clutches being engaged by compressing the packs of discs.

7. A vehicle according to claim 5 wherein the two clutch packs are compressed by a single actuating piston housing with the clutch bell.

8. A vehicle according to claim 6 wherein the output shafts each extend into the clutch bell sufficiently to engage their respective associated pack of clutch discs, the ends of the output shafts supporting each other via bearing means and being spaced from each other by a clearance.

9. A vehicle according to claim 8 wherein the disc packs are separated from one another by a spacer disc which is driven from the bell housing and which extends across the clearance between the ends of the shafts.

\* \* \* \* \*